United States Patent [19]

Helbig, Sr. et al.

[11] 3,750,133

[45] July 31, 1973

[54] HOME TELEVISION RECEIVER MODIFIED TO OPERATE AS VIDEO TERMINAL

[75] Inventors: Walter Allen Helbig, Sr., Medford Lakes, N.J.; Walter Lee Ross, Simi, Calif.

[73] Assignee: RCA Corporation, New York, N.Y.

[22] Filed: July 30, 1971

[21] Appl. No.: 167,636

[52] U.S. Cl.... 340/324 AD, 178/7.5 SE, 178/7.5 D, 315/27 R, 315/27 XY

[51] Int. Cl. .............................................. G06f 3/14

[58] Field of Search ................. 340/324 A, 324 AD; 315/27 R, 27 XY; 178/7.5 SE, 7.5 D

[56] References Cited

UNITED STATES PATENTS

| | | | |
|---|---|---|---|
| 3,017,625 | 1/1962 | Evans et al. | 340/324 A |
| 3,423,749 | 1/1969 | Newcomb | 340/324 A |
| 3,182,308 | 5/1965 | Dutton et al. | 340/324 A |

*Primary Examiner*—David L. Trafton

*Attorney*—H. Christoffersen

[57] ABSTRACT

A video terminal includes the deflection, power supply, video, and synchronization circuits of a commercial, home television receiver. The deflection yoke of the receiver is rotated through 90° to provide fast vertical rather than fast horizontal sweeps. The fast sweep frequency is approximately doubled to improve resolution along the rows of the characters displayed. The bandwidth of the receiver is increased to improve resolution in the fast sweep direction. The fast sweep retrace period, the slow sweep retrace period, and the frame repetition period of the receiver are not changed.

8 Claims, 6 Drawing Figures

INVENTORS
WALTER A. HELBIG &
WALTER L. ROSS
BY [signature]
ATTORNEY

INVENTORS
WALTER A. HELBIG &
WALTER L. ROSS
BY
ATTORNEY

INVENTORS.
WALTER A. HELBIG &
WALTER L. ROSS
BY
ATTORNEY

HOME TELEVISION RECEIVER MODIFIED TO OPERATE AS VIDEO TERMINAL

BACKGROUND OF THE INVENTION

Video terminals are in wide use in the computer industry in, for example, reservation systems, stock quotation systems, computer controlled test systems and so on. Such terminals include a cathode ray tube and various circuits associated with the cathode ray tube for sweeping the electron beam over the screen of the tube and for intensity modulating the electron beam to produce the pages of characters or other data to be displayed. The cost of the terminal can be minimized by employing a mass produced product such as a conventional black and white television receiver, provided that the receiver can display the required number of characters in a desired format and can do so without requiring major modification.

SUMMARY OF THE INVENTION

The fast sweep direction of a commercial home television receiver is changed to vertical and the fast sweep frequency is increased to provide more than the normal number of fast scan lines on the television screen. The fast sweep retrace time and the slow sweep repetition frequency remain unchanged. So modified, and with slight increase in receiver bandwidth, the receiver is capable of displaying, for example, 12 rows of 80 characters each, at high resolution.

DETAILED DESCRIPTION

Figure 1:
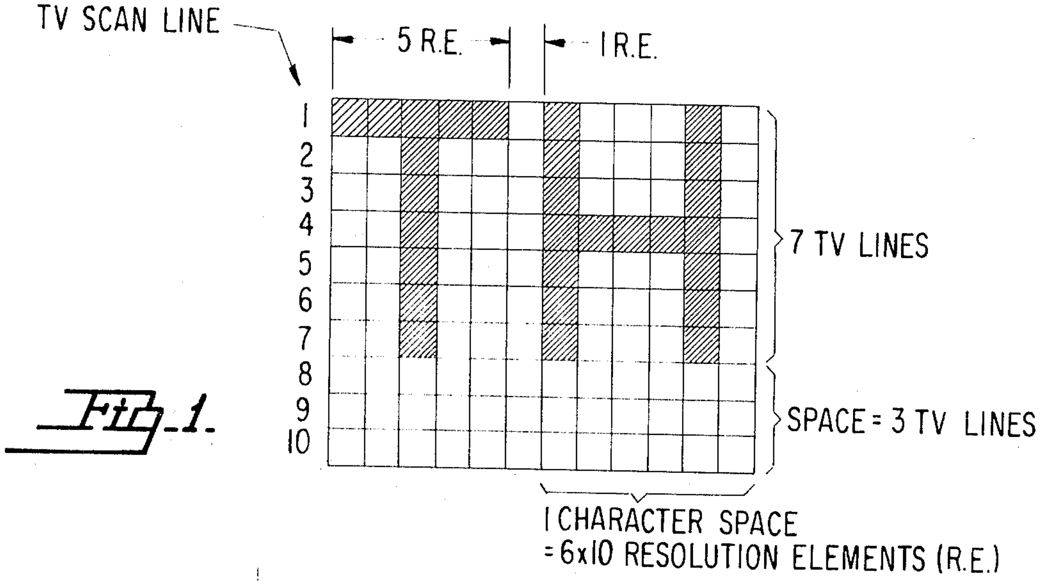
FIG. 1 is a schematic showing of a portion of the screen of a conventional television receiver employed as a video terminal.

Surveys show that there is a good market for a low cost video terminal capable of displaying 12 rows of 80 characters each, at reasonably good resolution. The analysis which follows first discusses the question of whether a commercial, home television receiver, without any modification, may be employed to meet this need. The conclusion is no, by reason of certin inherent limitations of the receiver. The discussion next deals with the modifications of the present invention which make the receiver suitable for this purpose.

A conventional television receiver operating from a 60 hertz power line frequency has a horizontal fast sweep of 63 ½ microsecond duration and a frame repetition rate of 30 frames per second. Of the 63 ½ microsecond sweep period, about 48 microseconds of sweep are visible on the screen, the remaining 15 ½ microseconds being required for the horizontal retrace. The one-thirtieth of a second frame period includes about 480 horizontal sweeps which are visible and 45 horizontal sweep periods (a total of about $2.8 \times 10^{-3}$ seconds) for the vertical (slow) retrace period.

To provide a display of characters with minimal acceptability, each character should occupy a space of at least six by 10 resolution elements. A resolution element — the smallest region on the screen that a normal viewer can distinguish from the next adjacent region, is one horizontal scan line, when considered in the vertical or slow sweep direction. In the horizontal direction (the fast sweep direction), the size of a resolution element is dependent on bandwidth. The greater the bandwidth of the receiver, the smaller the size of a resolution element and the greater the number of resolution elements per line.

In commercial black and white television transmission, the channels are separated by 6 megahertz (MHz). Thus, to start with, the home television receiver is designed to have a bandwidth of less than 6 MHz. In addition, a black and white television receiver includes a filter for the subcarrier for sound information at 4.5 MHz and a filter for the subcarrier for color information at 3.2+ MHz. The first filter occupies a bandwidth of about 20 KHz and the color subcarrier filter has a bandwidth of about 0.5 MHz. Taking all of this and also the picture tube bandwidth into account, the actual bandwidth available on a conventional television receiver is at best about 3.2 MHz and more typically the value may be closer to 2.5 MHz. At the 3.2 MHz bandwidth, during the visible portion of each horizontal sweep, about 153 cycles of the highest frequency (3.2 MHz) can be displayed.

The resolution in the horizontal or fast sweep direction of one-half cycle, at the highest frequency which can be displayed on the receiver. With the figures given above and considering for purpose of this discussion that all 48 microseconds of a horizontal sweep are usable for display purposes, then each horizontal line has a maximum of $153 \times 2 = 306$ resolution elements.

As already mentioned and as seen in FIG. 1, for a minimally acceptable displayed character, the character must have six resolution elements in the horizontal direction (the character quality actually is quite poor at this resolution). Five of these resolution elements are employed for displaying the character and one resolution element is employed as the space between two characters. With 306 resolution elements per line, the line can display (306/6 ) or 51 characters at a maximum. Thus, it is clear that the horizontal resolution on a conventional television receiver is inadequate to display 80 characters per row, even under the circumstances discussed above.

In accordance with the present invention, the resolution of the receiver in the horizontal direction is improved by rotating the yoke through 90° to make the fast sweeps extend in the vertical direction. There are now 480 resolution elements (one per scan line) in the horizontal direction and this already is enough to display 80 characters per row. However, as already mentioned, a character having only six resolution elements in the horizontal direction is only marginally acceptable to the user.

Figure 2:
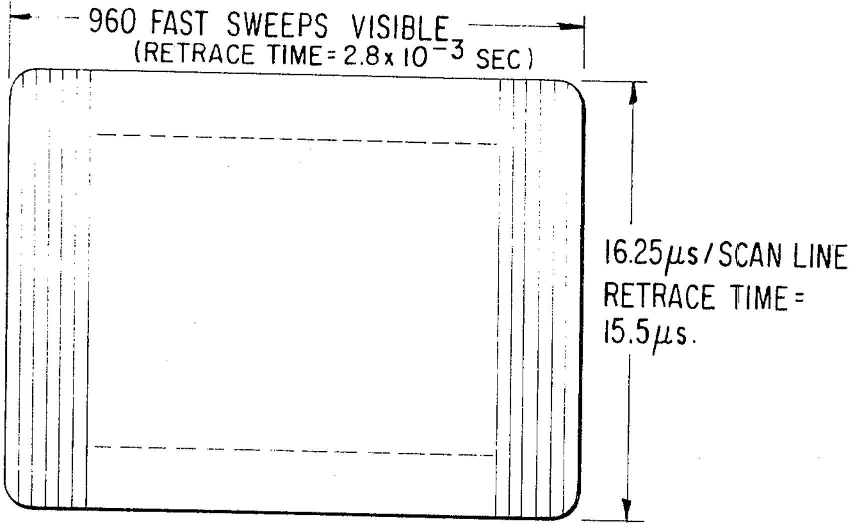
FIG. 2 is a schematic showing of the screen of a conventional television receiver modified in accordance with an embodiment of the present invention.

The situation is greatly improved according to the invention by increasing the number of fast sweeps. In the present example, the number is increased by a factor of approximately 2. This may be accomplished by doubling the horizontal oscillator frequency by, for example, decreasing by a factor of two the value of the capacitance in the horizontal oscillator tuned circuit. With this change, the number of fast sweeps per frame is increased to $525 \times 2 - 1 = 1,049$ sweeps (the number is increased to 1,049 rather than 1,050 to permit interlace) and of this number there are 960 visible fast sweeps, as shown in FIG. 2 and 89 fast sweeps which occur during the $2.8 \times 10^{-3}$ second (slow sweep) frame retrace interval. The fast sweep retrace time is maintained the same at 15.5 microseconds to avoid having to make major circuit modifications (this is discussed at greater length later).

Figure 3:
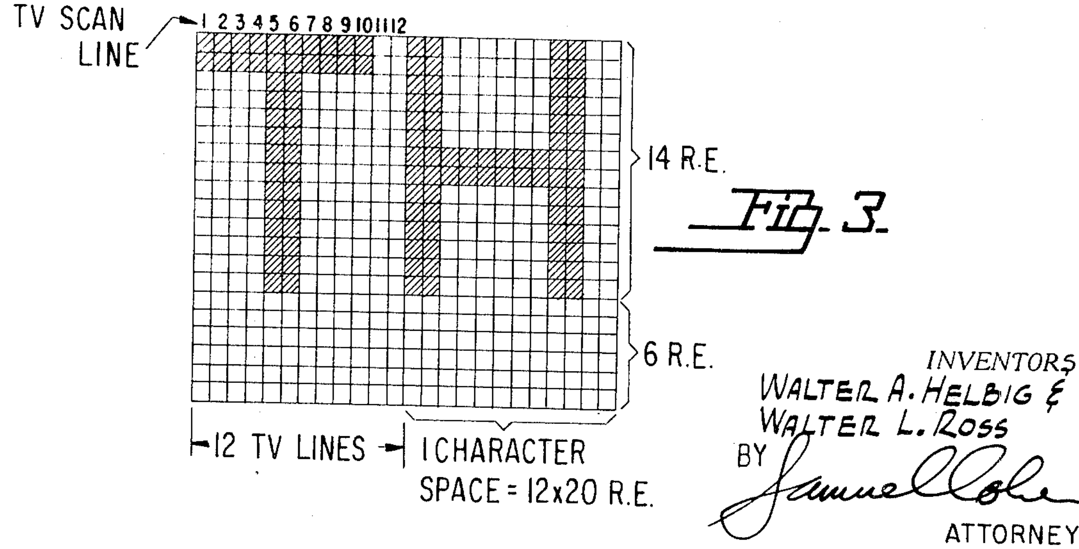
FIG. 3 is a schematic showing of a portion of the screen of FIG. 2.

The space occupied by a character now may be 12 resolution elements in the horizontal direction, 10 of these elements being employed for actual display purposes and two of the elements being employed as a space between two adjacent characters. This is shown in FIG. 3. It should be kept in mind that each resolution element in the horizontal direction is now a television scan line.

When the fast sweep frequency is doubled, the fast sweep period must be reduced by a factor of 2 if the same frame repetition rate of one-thirtieth second is to be retained. Whereas formerly the fast sweep period was 63.5 microseconds, it is now reduced to 31.75 microseconds. To avoid substantial modifications to the TV receiver, the fast sweep retrace period is not changed. It remains at 15.5 microseconds as shown in FIG. 2. This means that only 16.25 microseconds of each fast sweep is visible.

As mentioned in the introductory portion of this application, it is desired that there be 12 rows of 80 characters each. FIG. 3 shows that each character occupies 20 resolution elements. This would appear to indicate that 240 resolution elements would be needed in the vertical direction. To obtain 240 resolution elements in 16 ½ microseconds would require a much greater bandwidth than is available. Simple calculations show that the actual bandwidth needed would be about 7.3 MHz. It is simply not practical to achieve this figure in a conventional television receiver.

The above problem is solved according to the present invention in the following way. To start with, by eliminating or by-passing the color subcarrier filter, the TV receiver bandwidth is increased. Further increase in bandwidth may be obtained by adjusting the value of the inductance 35 (FIG. 5) — a tuning slug adjustment, in the output circuit of the video amplifier. Overall, with these minor changes, the video amplifier bandwidth may be increased to about 3.7 MHz. This (the 3.7 MHz bandwidth) is slightly more than half of the bandwidth (7.3 MHz) which, on first observation, is needed. At this frequency, each cycle has a duration of about 0.27 $\mu$ sec. The 16.25 $\mu$ sec trace therefore can accommodate about 120 half cycles at this frequency; that is, each fast (vertical) trace includes 120 resolution elements. At this resolution, 12 rows, each with 10 resolution elements in the vertical direction, could be accommodated. But this is only one half of the 20 resolution elements, in the vertical direction, shown in FIG. 3.

Now, in addition, according to the present invention the vertical pattern is generated in such a way that the resolution elements can appear illuminated or not illuminated, as the case may be, only in groups of at least two at a time. This achieves the goal of 12 rows of characters and does so with a resolution simulating that of 20 resolution elements, in the vertical direction, per row. The term "simulating" is employed because the positional accuracy in the vertical direction appears to the eye of the observer to be very close to that which would be obtained if there were actually 20 resolution elements per row available.

Figure 5:
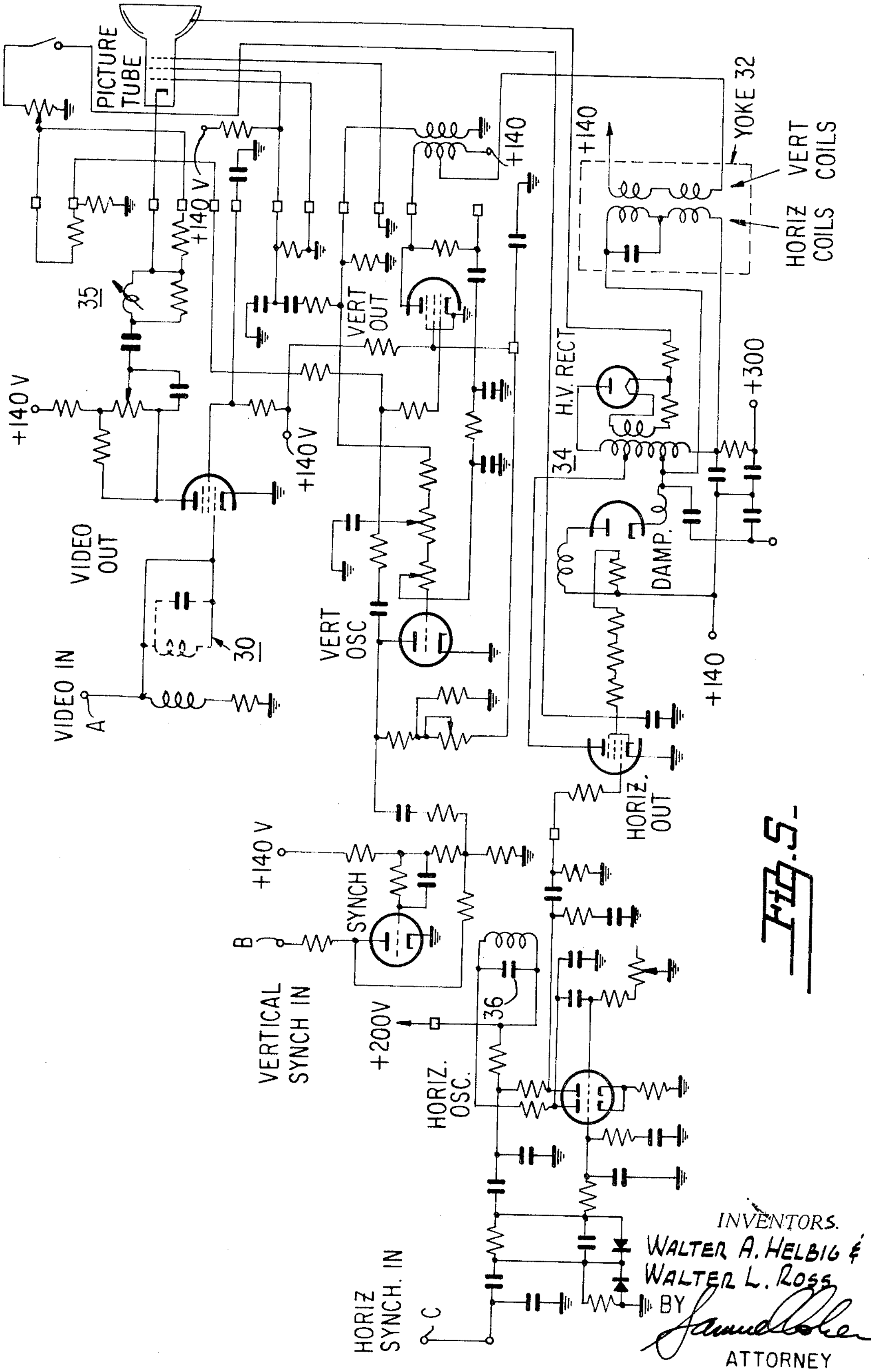
FIG. 5 is a schematic showing of the portion of a conventional black and white television receiver employed to produce the displays of FIGS. 2–4.

FIG. 5 shows the portion of a conventional black and white television receiver (RCA chassis Model No. KCS168) which may be employed in the present invention. The radio frequency tuners, the sound and audio stages, the intermediate frequency stages and the automatic gain control (AGC) stage are not needed and therefore are not shown in FIG. 5. The elimination of these stages automatically eliminates the color filter trap and therefore permits the bandwidth of the receiver to be increased the desired amount as already discussed.

In a conventional television receiver, the signal transmitted and subsequently picked up by the receiver is a composite signal which includes video, vertical synchronization, and horizontal synchronization information. In the system of which the present invention is a part, the video information is supplied separately by a character generator and vertical and horizontal synchronization signals are provided separately by a timing generator. The video information is applied to terminal A in FIG. 5, which terminal leads to a control grid of the video output amplifier; the vertical synchronization information is applied to terminal B which leads to the control grid of the synchronizer stage; and the horizontal synchronization information is applied to terminal C which leads to the horizontal oscillator. In the present instance, it should be kept in mind that what is termed horizontal synch in FIG. 5 is actually the fast sweep (which, as discussed below, extends in the vertical direction) synchronization signal and what is termed vertical synch is actually the frame reset signal.

The approximate doubling of the fast sweep frequency mentioned above is obtained by changing the value of the capacitor 36. In the particular chassis mentioned above, the usual value of this capacitor is 0.0039 microfarads. This makes the tuned circuit resonant frequency sufficiently close to the desired value that the horizontal synch pulses can hold the fast sweep frequency at the required value. Alternatives are available. For example, a similar effect can be achieved by changing the value of the inductance of the tuned circuit.

The yoke 32 is rotated through 90° to cause the fast sweeps to extend in the vertical direction. Also, the turns ratio of the horizontal output transformer 34 is changed to increase the high voltage generated to its normal value. It is necessary to do this as the increase in horizontal sweep frequency results in fast sweeps of lower amplitude and fast sweep flybacks of lower amplitude. The latter cause the high voltage which is produced to be of lower than its normal value and this results in decreased raster size. As an alternative, a voltage doubler may be employed to increase the high voltage without changing the horizontal transformer design; however, this would represent added cost. Additionally, if desired, the deflection yoke design may be slightly modified, if additional horizontal or vertical expansion be needed; however, in practice good results have been obtained without such modification.

The sound filter trap is shown in dashed line at 30 in FIG. 5. If desired, this trap may be retained in the circuit with no modification. Alternatively, the trap may be removed (or by-passed) and the control grid of the video output tube connected directly to the video input terminal as shown by solid line in FIG. 5. Removing or by-passing the trap and further tuning adjustments permit increase in the bandwidth of the receiver to about 5 MHz (and this is about the limit in most commercial TV receivers due to inherent bandwidth limitations in the amplifier and kinescope). However, as already implied, even at the 3.7 MHz bandwidth (the sound filter trap in the circuit) suitable operation is achieved.

The system of which the present invention is a part employs a number of techniques which are in themsleves conventional. The digital storage and generation of video signals may be accomplished in the manner shown, for example, in Clark, U.S. Pat. No. 3,888,391 or in Cole et al., U.S. Pat. No. 3,345,458 except that the video is written on the screen by vertical rather than horizontal slices. A typical system which may be employed is shown in block diagram form in FIG. 6. To simplify the drawing, multiple conductors, where present, are illustrated by a single line.

Figure 6:
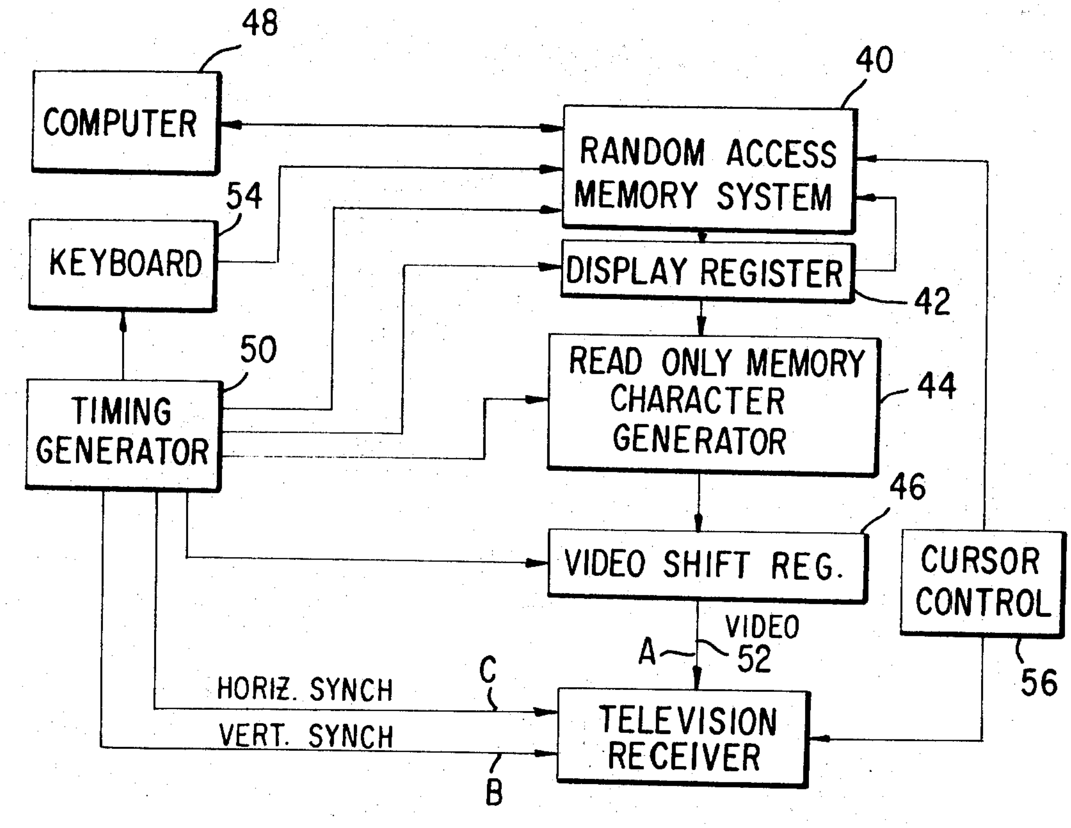
FIG. 6 is a block diagram of a computer system employing a video terminal according to an embodiment of the invention.

The system of FIG. 6 includes a random access memory system 40, a display register 42, a character generator 44 which may include a read only memory, and a video shift register 46. In operation, a computer 48, which may be one of the time-shared type, and which may be servicing a relatively large number of video terminals, supplies binary coded characters to the random access memory system 40. Each character may be transmitted in a conventional format such as in an 8 bit ASCII code. When the transfer is completed (and this transfer may be accomplished in time shared fashion), the computer may go on about its other business.

The memory system 40 may be any one of a number of types. In present day technology, for example, the memory system may include a semiconductor memory; however, other memories such as magnetic core memories also are suitable. The memory capacity should be sufficient for at least 80 by 12 = 960, 8 bit information characters and for control characters. The latter may be employed for purposes such as indicating parity errors on the screen, and performing various control functions. These are not of direct interest here and are therefore not discussed further.

Figure 4:
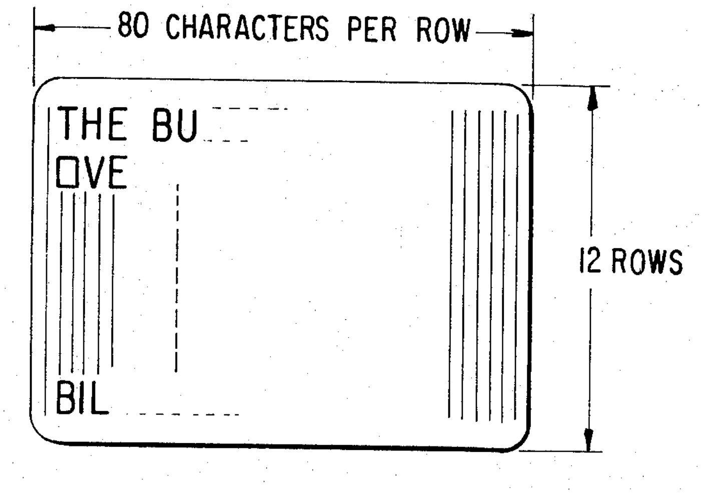
FIG. 4 is a schematic showing of a complete page of data displayed on the screen of FIG. 2.

In response to read out signals supplied by the timing generator 50, the characters stored in the memory system 40 may be read out a character at a time or a column of characters at a time. The particular method employed will depend upon the memory speed and other design considerations. For purposes of this discussion, it may be considered that a column of characters, say the first column TO . . . B of FIG. 4 is read out of the memory system 40 and supplied to the display register 42. In addition, as is usual practice, each read-out cycle is followed by a regenerate cycle to restore the characters read out of the memory to the same locations from which they were read out.

The purpose of the character generator 44 is to convert the binary coded characters to video signals. In response to timing pulses produced by timing generator 50, the character T may be converted to two ones followed by 18 zeros during the first scan line. Next the character 0 is converted to 14 ones followed by six zeros and so on until the first vertical slice through the last character B (14 ones followed by six zeros) is obtained. The video information produced by generator 44 is placed in the video shift register 46. Again, one complete slice through the first column may be transferred to the video shift register, at a time, provided the character generator 44 is sufficiently large, but preferably the transfer to the video shift register is accomplished a character slice at a time, that is, 20 bits of video at a time. The timing generator 50 shifts the video information stored in register 46 at a rate such that the video output of the shift register at lead 52 is applied to the television receiver 56 (which is the receiver of FIG. 5) synchronously with the fast sweep. As already mentioned, the design of the character generation system is such that bits of the same value must occur in minimum sequences of two. Thus, two ones followed by 18 zeros is a possible digital video slice of information, whereas one one followed by 19 zeros is not permitted. Of course, a single zero as the first bit of a slice through a character is permitted as the previous six bits (the space) are all zeros; similarly, a single zero as the 14th bit is permitted as the following six bits (the space) are all zeros.

After the first slice through the first column of characters has been completed, the same process is repeated for the third, the fifth and all following odd numbered vertical slices until all the odd lines of the first column of characters have been written on the cathode ray tube screen. Thereafter (during the 11th and 12th vertical scan lines), the first column of characters is removed from the display register 42 and the second column of characters is transferred from the memory system 40 to the display register 42. A process similar to this is completed for the odd lines of the second column of characters and for odd lines of all following columns of characters until the first field of the entire message (the page of information) is present on the screen. Next, this process is repeated for the even numbered vertical lines (the second or interlaced field of the frame). Thereafter, the system 40, 42, 44 and 46 continuously refreshes the display (successively rewrites the odd and even fields) under the control of the timing generator 50.

The keyboard 54 is for the purpose of altering the displayed information. A cursor (such as an underline) may be employed by the operator for indicating a character on the screen which is to be erased and replaced with a new character. The cursor control may be manually manipulated to place the underline at the correct screen location. In response to this information (which may be converted to a memory address) and the depression of appropriate keys on the keyboard 50, a character stored in the addressed location of the random access memory 40 may be removed from this location and another character inserted instead. These characters thereafter will be translated to video at 44, and the video supplied at appropriate times to the television receiver to appear at the place on the screen indicated by the cursor.

The discussion above concentrates on a video terminal which displays 12 rows of 80 characters each. It is to be appreciated that the terminal design may be such that many other formats can be displayed. For example, the number of rows can be increased by reducing the space between rows. As a second example, the terminal may display two pages of information side-by-side, each with 12 rows of 40 characters each. As another alternative, the video terminal can, of course, display fewer than 12 rows and fewer than 80 characters per row. In these modes of operation, the size of each character can be increased if desired and the number of resolution elements per character increased correspondingly. It is also to be understood that while, for purposes of this discussion, only capital letters have been illustrated, in practice the read only memory is capble of producing the video necessary for a number of different fonts, both upper and lower case, and including letters, numbers and symbols.

It is stressed in the discussion above that it is important that the fast sweep flyback time remain the same when the television receiver is modified in accordance with the teachings of the present invention. An understanding of the reasons why this is so requires a brief explanation of the fast sweep deflection and the high voltage generation process. The horizontal output amplifier of the television receiver drives the horizontal beam deflection coils with the ramp that causes the electron beam to be deflected at a constant velocity across the screen of the cathode ray tube. Upon the completion of the deflection of the beam, the deflection signal is reduced to zero in order to move the electron beam back to the starting side of the screen. As the deflection of the electron beam is done magnetically, the return of the beam to its starting position corresponds to a collapse in the magnetic field. This collapsing magnetic field induces a reverse voltage in the high voltage transformer (34 of FIG. 5) and this induced reverse voltage is amplified, rectified and filtered to produce the high voltage employed in the television receiver.

The high voltage transformer 34 of FIG. 5 in which the action described above takes place is resonated by its own internal inductance with the distributed capacity in the television set to a frequency whose period is equal to twice the amount of time allowed for the beam flyback. The distributed capacity has a value which is determined by the way in which the television set is constructed (length of leads, relative positions of various components and so on), and the inductance value is a function of the construction of the transformer.

If it were necessary to reduce the flyback time, this would mean that the resonant frequency of the transformer would have to be increased. This is turn would mean decreasing the inductance of the transformer since for a given television set the distributed capacitance cannot easily be changed. Decreasing the inductance would mean decreasing the number of turns in the transformer. If the turns ratio is to remain the same, this means a decrease in both the number of primary and secondary windings; however, the total number of turns cannot be reduced below a lower limit at which the primary has a single turn. In addition, as already mentioned, as in the present system the flybacks are of reduced amplitude, in practice, the turns ratio must be increased to step up the high voltage to its required value and this, considered with the single turn primary limitation, is somewhat inconsistent with reducing very much the total number of transformer turns. The amount of high voltage and power needed for the cathode ray tube does not change when the sweep frequency is changed and part of this power is that obtained from the transformer operation described above. Thus, any decrease in fast sweep flyback time should not cause the amount of energy recovered by the resonant action to be decreased. To recover this amount of energy in the shorter flyback period available would mean that a higher rate of change of voltage ($v$) with time ($t$) (a higher $dv/dt$) would have to be used. However, the materials with which the transformer is constructed limit this rate. In most cases a substantially higher rate would require new materials (at a significantly higher cost) to accomplish the desired result.

In summary, because the distributed capacitance associated with a particular television receiver cannot, as a practical matter, easily be changed and because for reasons discussed above the number of transformer turns cannot easily be reduced below a given limit, and because the material of which the transformer is made cannot easily be changed without substantial additional expense, it is important when attempting to use a commercial television receiver for video display purposes such as described here that the fast sweep flyback time not be altered.

It is also mentioned in the previous discussion that it is important that the frame rate of the television receiver not be changed when modifying the receiver in accordance with the present invention. The reason is to prevent the introduction of undesirable noise signals. Commercially available television receivers in this country operate at 30 frames (60 fields) per second. At this frequency, which is synchronous with the 60 Hz power line frequency, picture distortion due to stray variable magnetic fields resulting from the 60 Hz electric power frequency, remains stable on the screen. This distortion does not detract appreciably from the viewers ability to recognize the information being shown as the appearance of the presentation remains constant. Were the field rate changed to some value not synchronous with 60 Hz, the picture distortion due to stray fields originating from the 60 Hz power frequency would move relative to the information being displayed and this would be most annoying. In addition, changing the field rate to a value other than that stated above can cause annoying changes in the picture size or position on the screen of the cathode ray tube. These annoying noise effects may be lessened by adding shielding to the set but this again would increase the cost of the set.

What is claimed is:

1. A method of modifying a commercial television receiver of the type having fast horizontal sweeps, each consisting of an active portion which can be viewed on the screen of the television display means and a retrace portion, and a frame repetition frequency; comprising the steps of:

changing the fast sweep direction to the vertical direction; and increasing the fast sweep frequency by reducing the duration of the active portion of the fast sweep without changing the fast sweep retrace duration, or the frame repetition frequency.

2. The method of claim 1, where the step of increasing the frequency consists of increasing it by a factor of approximately $n$, where $n$ is an integer greater than 1.

3. A method of modifying a commercial home television receiver of the type having: a kinescope, a kinescope deflection yoke, and means supplying slow and fast sweep signals to said yoke for rapidly deflecting the electron beam across the screen of said kinescope along successive horizontal lines, each horizontal fast sweep including an active portion which can be made visible on the screen and a retrace portion; comprising the steps of:

rotating the yoke through an angle of approximately 90°; and increasing the fast sweep frequency by a factor of approximately n by reducing the duration of the active portion of the fast sweep without changing the duration of the retrace portion of the fast sweep or changing the slow sweep frequency, where $n$ is an integer greater than 1.

4. The method of claim 3, where $n = 2$.

5. The method of claim 3, further including the step of increasing the bandwidth of the receiver to improve its resolution.

6. The method of claim 5 wherein the step of increasing the bandwidth of the receiver includes by-passing the television receiver color filter trap.

7. The method of claim 5, wherein the step of increasing the bandwidth of the receiver includes adjustment of the tuning of the television receiver video amplifier.

8. A video terminal comprising, in combination;

a display assembly comprising the video, synchronization, vertical and horizontal deflection circuits, power supply circuits and kinescope of a home television receiver interconnected in conventional fashion but with the kinescope yoke rotated through an angle of approximately 90° to provide fast vertical rather than fast horizontal sweeps, and with the tuned circuit for the horizontal oscillator of said horizontal deflection circuit including circuit elements of a value to produce horizontal sweeps at a frequency approximately double the normal sweep frequency, and with the bandwidth of said receiver having a value to permit each fast trace to include at least 200 resolution elements along the displayable portion of said sweep; and character generator means coupled to said display assembly for supplying the successive bits for intensity modulating the electron beam of the kinescope as it sweeps in the vertical direction to produce, in a plurality of successive sweeps, a column of characters, said character generator means including means supplying bits which always retain the same value for at least 2 bit intervals.

* * * * *